United States Patent [19]

Joby

[11] 4,303,976
[45] Dec. 1, 1981

[54] FUEL CONTROL FOR A MULTI-ENGINE GAS TURBINE INSTALLATION

[75] Inventor: Michael J. Joby, West Midlands, England

[73] Assignee: Lucas Industries, Ltd., Birmingham, England

[21] Appl. No.: 74,533

[22] Filed: Sep. 11, 1979

[30] Foreign Application Priority Data

Sep. 15, 1978 [GB] United Kingdom ............. 36972/78

[51] Int. Cl.³ .................... F02C 9/26; G05B 11/42
[52] U.S. Cl. ................... 364/431; 60/39.28 R; 60/224; 364/442
[58] Field of Search ............ 364/431, 442; 60/224, 60/243, 39.28 R, 39.15

[56] References Cited

U.S. PATENT DOCUMENTS

| | | | |
|---|---|---|---|
| 3,174,284 | 3/1965 | McCarthy | 60/39.28 R X |
| 4,018,044 | 4/1977 | Joby et al. | 60/39.28 R X |
| 4,040,250 | 8/1977 | Saunders et al. | 60/39.28 R |
| 4,100,731 | 7/1978 | Janes et al. | 60/39.15 |
| 4,185,460 | 1/1980 | Moore et al. | 60/224 |
| 4,188,781 | 2/1980 | Johnson et al. | 60/39.28 R |

*Primary Examiner*—Felix D. Gruber
*Attorney, Agent, or Firm*—Holman & Stern

[57] ABSTRACT

An electronic fuel control for a multi-engine gas turbine engine provides either independent or master-slave operation according to the position of a selector switch. In one position independent speed demand signals are separately compared with independent actual speed signals and the error signals produced are fed to proportional-plus-integral fuel controls. In the other position engine fuel control receives a signal corresponding to the error between $\frac{1}{2}$ of the sum of the average speed demand and the actual speed of that engine whereas the other engines fuel control receives only an error signal representing the difference between the two engine speeds.

1 Claim, 1 Drawing Figure

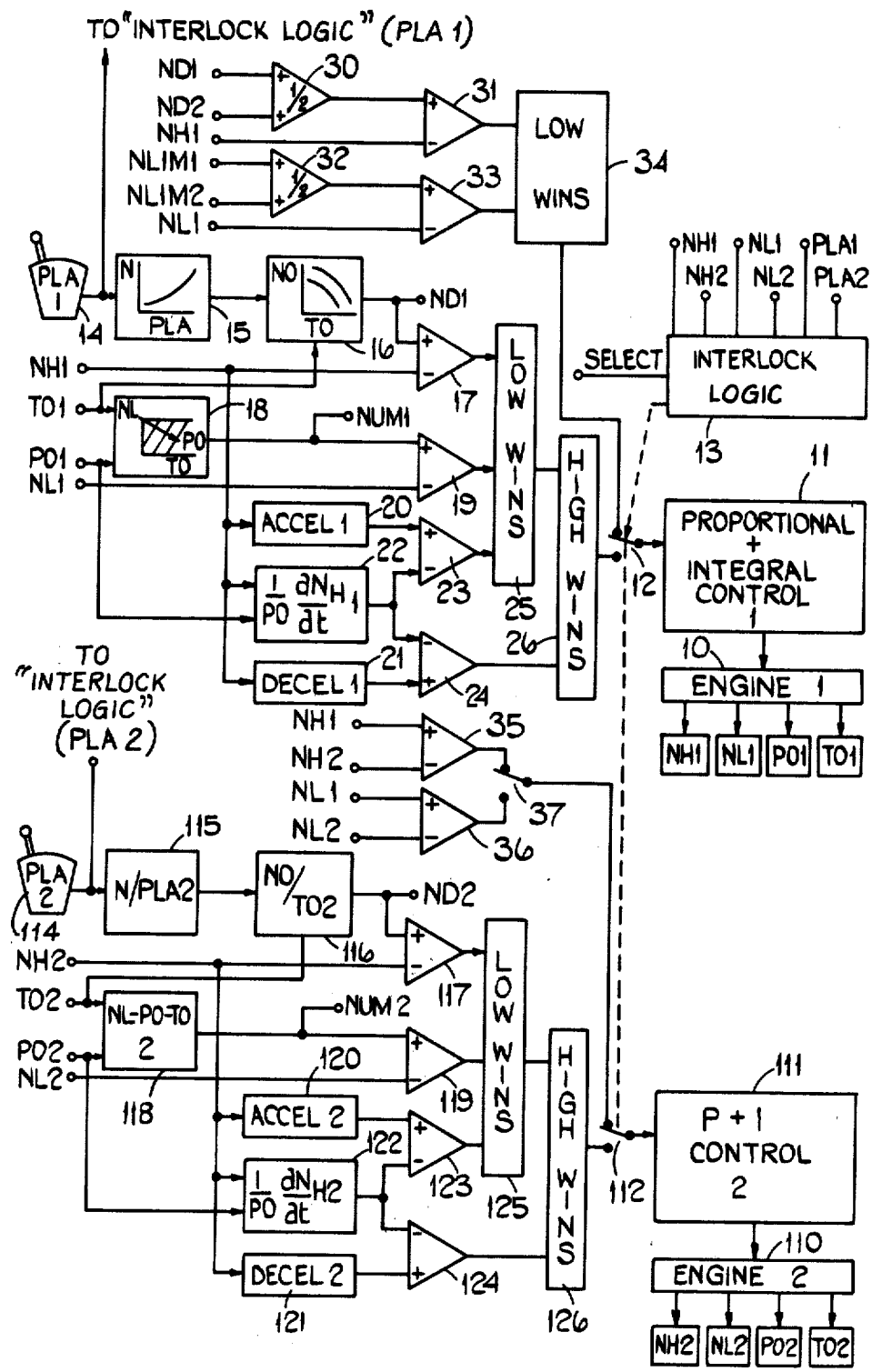

ly constant and the speed is being held at 100%. An excursion to lowest wins gate 25 would thus obtain an output of proportional to the rate of change of NH1, NH2 divided by the ambient pressure PO1, PO2.

FUEL CONTROL FOR A MULTI-ENGINE GAS TURBINE INSTALLATION

TECHNICAL FIELD

This invention relates to an electronic fuel control for a multi-engine gas turbine installation.

BACKGROUND OF THE INVENTION

In a multi-engine installation, particularly an aircraft installation, it is desirable to ensure that the engines can be controlled individually, but that they can also be synchronised. When switching over from normal independent control to synchronised control it is desirable to ensure that there is no sudden change in the total thrust from the engines.

It is an object of the invention to provide an electronic fuel control for a multi-engine gas turbine installation with a synchronisation control which can be introduced without any sudden change in thrust.

SUMMARY OF THE INVENTION

An electronic fuel control in accordance with the invention comprises at least two independent channels each including a speed demand signal generating means and first error signal generating means for generating a first error signal dependent on the error between the speed demand signal and an actual speed signal corresponding to the actual speed of an associated one of the engines; common means connected to speed demand signal generating means of each channel and producing an output of magnitude corresponding to the average of the speed demand signals; second error signal generating means for generating a second error signal dependent on the error between the output of said common means and said actual speed signal in respect of a specific one of the engines; third error signal generating means for the or each other engine generating a third error signal corresponding to the difference between the actual speed signals in respect of said one specific engine and said other engine; a fuel control means for each engine, each adapted to control fuel flow to the associated engine in accordance with an error signal fed thereto; and error signal selector means adapted in one condition to feed the first error signal from the first error signal generating means to the respective fuel control means and in its other condition to feed the second error signal to the fuel control means associated with said one specific engine and said third error signal to the fuel control means associated with the or each other engine.

BRIEF DESCRIPTION OF THE DRAWING

An example of the invention is shown in the accompanying drawing which is a block diagram of a twin engine gas turbine installation.

DESCRIPTION OF THE PREFERRED EMBODIMENT

As shown in the drawing each of two gas turbine engines 10, 110 has associated with it four transducers, namely a high pressure spool speed transducer NH1, NH2, a low pressure spool speed transducer NL1, NL2, an ambient temperature transducer TO1, TO2 and an ambient pressure transducer PO1 and PO2. The fuel flow to each engine is controlled by an electrically operated servo-valve 11, 111 which has a proportional with integral control characteristic as is well known per se. The error signals that provide the inputs to the servo-valves 11, 111 are routed thereto by means of selector switches 12, 112 which are ganged together and are operated by an interlock logic unit 13, the purpose of which will be explained in more detail hereinafter.

For each engine there is a complete separate control channel for deriving the error signals which are fed to the respective servo-valves 11, 111 in one position of the selector switches 12, 112. Each such channel includes a speed demand signal generator including a pilot's control 14, 114, a function generator 15, 115 which converts the output of the pilot's control into a non-linear function of the displacement of the pilot's control, and a temperature compensation circuit 16, 116 which modifies the output of the function generator 15, 115 in accordance with the ambient temperature TO1, or TO2. The output of ND1, ND2 of the compensation circuit 16, 116 represents the desired value of the speed of the high pressure spool of the associated engine. This desired value signal ND1, ND2 is applied to one input of an error signal generating means in the form of a difference amplifier 17, 117 to the other input of which the actual value signal NH1, NH2 is applied. The output of this difference amplifier 17, 117 thus represents the error between the desired high pressure spool speed and that actually existing and in normal steady running it is, in fact, this error signal which passes via the selector switches 12, 112 to the fuel control servo-valves 11, 111.

There are, however, occasions when it is required for different control loops to take precedence. One such different loop provides a limit for the low pressure spool speed NL1, NL2 as a function of ambient temperature TO1, TO2 and pressure PO1, PO2. To this end the temperature and pressure signals are supplied to a function generator 18, 118 which produces an output signal NL1M1, NL1M2. This output signal is applied to one input of a difference amplifier 19, 119, the appropriate NL1, NL2 signal being applied to the other input.

There are also two control loops which come into use in rapid acceleration and deceleration respectively. The acceleration loop includes an acceleration function generator 20, 120, which has an input from the NH1, NH2 transducer and provides an output signal representing the maximum permissable positive rate of change of NH1, NH2 per unit ambient pressure. The deceleration loop likewise includes a deceleration function generator 21, 121 providing an output signal representing the maximum permissable negative rate of change of NH1, NH2 per unit ambient pressure. The acceleration and deceleration loops include a further function generator 22, 122 which has inputs from the ambient pressure transducer PO1, PO2 and from the NH1, NH2 transducer. The function generator 22, 122 uses conventional circuits to obtain an output proportional to the rate of change of NH1, NH2 divided by the ambient pressure PO1, PO2.

The output of function generator 22, 122 is compared with those of the function generators 20, 120 and 21, 121 in difference amplifiers 23, 123 and 24, 124 respectively.

The output signals from difference amplifiers 17, 19 and 23 (117, 119 and 123) are applied to the inputs of a "lowest wins" gate 25 (125) and the output signal from gate 25 (125) together with that from the difference amplifier 24 (124) is applied to a highest wins gate 26 (126). In normal steady state conditions the output of gate 25 will be the same as that from difference amplifier 17, i.e. zero, the outputs of amplifiers 19 and 23 being of positive polarity. In the event of speed NL1 exceeding its prescribed limit the output of amplifier 19 will go negative, taking over gate 25. Similarly, in acceleration, when the output of amplifier 17 becomes positive, the amplifier 23 will take over to limit the rate of change of NH1. The gate 26 is normally won by the output of gate 25, but, in deceleration the output of gate 25 becomes negative and the output of amplifier 24 can win gate 26 to limit the rate of change of NH1.

With the selector switch 12, 112 in one of its two positions, the gates 26, 126 are connected to the controls 11, 111 and provide independent control of the two engines in a normal manner.

For synchronised operation of the two engines 10, 110 some additional circuits are included. For the engine 10 there is provided a "master" control which includes a circuit for producing an error signal representing the difference between the NH1 signal and the average of the two ND1 and ND2 high pressure spool speed demand signals from the function generators 16, 116. This circuit includes a common summing amplifier 30 with a gain of ½ and with input terminals connected to the outputs of the function generators 16, 116 and a difference amplifier 31 serving as an error signal generating means by comparing the output of amplifier 30 with the NH1 signal.

The control for engine 10 also includes another summing amplifier 32 with a gain of ½ for summing the outputs NL1M1 and NL1M2 of the function generators 18 and 118 and another difference amplifier 33 comparing the output of amplifier 32 with the NL1 signal. A lowest wins gate 34 has its inputs connected to the outputs of amplifiers 31 and 33 and its output terminal connected to the switch 12.

For the engine 110, the "slave" control system merely includes two difference amplifiers 35 and 36 serving as error signal generators. The amplifier 35 compares the NH1 and NH2 signals and the amplifier 36 compares the NL1 and NL2 signals. A switch 37 is provided to enable the pilot to decide which of the two error signals produced is used in the control.

When master-slave operation is selected the engine 10 is controlled to minimise the error signal emanating from the amplifier 31, amplifier 33 winning the gate 34 only when the NL1 signals reaches the average of the NL1M1 and NL1M2 signals. The engine 110 is controlled to keep the appropriate speed of engine 110 the same as that of engine 10.

The interlock logic unit 13 controls the switch 12, 112 to prevent selection of synchronised operation when the difference between various corresponding signals in the two channels is too great. Thus, it has inputs from NH1 and NH2, from NL1 and NL2 and from the two pilot's controls 14 and 114. In addition the logic unit 13 will operate switch 12, 112 during synchronised operation if, as a result of a fault, a mismatch occurs, thereby causing the system to revert to independent channel operation.

I claim:

1. An electronic fuel control for a multi-engine gas turbine installation comprising at least two independent channels for controlling respective first and second engines, each channel including a speed demand signal generating means for providing a first signal representation of desired speed and first error signal generating means for generating a first error signal dependent on the error between the first signal and an actual speed signal corresponding to the actual speed of the engine controlled by said each channel; common means connected to receive said first signal of each channel for providing an output of magnitude corresponding to the average of the first signals; second error signal generating means for generating a second error signal dependent on the error between the output of said common means and said actual speed signal in respect of a specific one of the engines; third error signal generating means provided for engine controlled by the other of said channels for generating a third error signal corresponding to the difference between the actual speed signals in respect of said first and second engines; a fuel control means for each engine, each adapted to control fuel flow to the associated engine in accordance with an error signal fed thereto and error signal selector means having two conditions and adapted in one condition to feed the first error signal from the first error signal generating means to the respective fuel control means and in its other condition to feed the second error signal to the fuel control means associated with said one specific engine and said third error signal to the fuel control means associated with each other engine.

* * * * *